United States Patent
Muramatsu

(10) Patent No.: US 6,830,138 B2
(45) Date of Patent: Dec. 14, 2004

(54) STATOR

(75) Inventor: Kazuhiko Muramatsu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/448,178

(22) Filed: May 30, 2003

(65) Prior Publication Data
US 2004/0026200 A1 Feb. 12, 2004

(30) Foreign Application Priority Data

May 31, 2002 (JP) ........................................ 2002-158460

(51) Int. Cl.$^7$ .............................................. F16H 41/24
(52) U.S. Cl. ......................................... 192/46; 192/214
(58) Field of Search ........................ 192/45.1, 46, 212, 192/214; 60/345

(56) References Cited

U.S. PATENT DOCUMENTS

| | | | | |
|---|---|---|---|---|
| 4,620,621 A | * | 11/1986 | Kulczycki et al. | .......... 192/212 |
| 4,856,639 A | * | 8/1989 | Fukushima | .................. 192/214 |
| 5,579,880 A | * | 12/1996 | Feldhaus et al. | ............. 192/214 |
| 5,759,105 A | * | 6/1998 | Bochot et al. | ............... 192/214 |
| 5,947,245 A | * | 9/1999 | Costin et al. | .................. 192/46 |
| 6,293,870 B1 | * | 9/2001 | Nagano et al. | ............. 192/214 |
| 2001/0025758 A1 | * | 10/2001 | Kinoshita et al. | ............. 192/46 |
| 2001/0052233 A1 | * | 12/2001 | Maeda et al. | .................. 60/345 |
| 2002/0005327 A1 | * | 1/2002 | Muramatsu et al. | .......... 192/46 |
| 2003/0146063 A1 | * | 8/2003 | Yamada et al. | ................ 192/46 |

FOREIGN PATENT DOCUMENTS

GB 2071776 A * 10/1981 ............. F01D/9/00

* cited by examiner

Primary Examiner—Saul Rodriguez
(74) Attorney, Agent, or Firm—Miles & Stockbridge P.C.

(57) ABSTRACT

In a stator in which a damper mechanism is provided between a ratchet one-way clutch mechanism and a vane wheel, the damper mechanism is provided with a friction element.

2 Claims, 3 Drawing Sheets

STATOR

BACKGROUND OF THE INVENTION

1. Field of the Invention

The present invention relates to a torque converting stator used with a transmission, particularly an automatic transmission in an automobile, an agricultural machine, a building machine, an industrial machine or the like and using a ratchet one-way clutch utilizing a ratchet (pawl) as a locking mechanism among one-way clutches having a back-stop function.

2. Related Background Art

In general, a one-way clutch used with an automatic transmission includes outer and inner races which are rotated relative to each other so that rotational torque is transmitted only in one direction by engaging sprags or rollers (for transmitting torque between the outer race and the inner race) with a cam surface provided on a track surface of the outer race or the inner race and the rotational torque is not transmitted in an opposite direction.

Among such one-way clutches, there is a ratchet one-way clutch in which a ratchet is used as a torque transmitting member for transmitting the torque between the outer race and the inner race. The ratchet one-way clutch is constituted by an outer face having pockets in its inner periphery, an inner race disposed in coaxial with the outer race and having notches in its outer periphery, pawls housed in the pockets and fitted in the notches of the inner race to achieve a locking condition of the one-way clutch thereby transmitting the torque between the inner race and the outer race, and elastic members for biasing the pawls toward the inner race.

In the ratchet one-way clutch having the above-mentioned arrangement, when the one-way clutch is rotated in one direction, since the pawls are freely slid on the outer periphery of the inner race, the outer race and the inner race are idly rotated relative to each other. Then, when the one-way clutch tries to be rotated in an opposite direction, the pawls are engaged by the notches, thereby establishing a lock-up condition of the one-way clutch.

As a conventional example in which the ratchet one-way clutch having the above-mentioned function is used as a torque converting stator, there is an arrangement as shown in FIG. 5.

FIG. 5 is an axial sectional view showing a conventional example of a torque converting stator using a ratchet one-way clutch. A stator 50 includes an outer race 53 disposed within an inner periphery of a vane wheel 51, and an inner race 54 disposed in coaxial with the outer race 53. At an inner periphery of the outer race 53, ratchets or pawls 55 are disposed within recessed formed in an outer periphery of the inner race 54.

Each pawl 55 is axially confined by the outer race 53 and an inner diameter portion 52 of the vane wheel 51. In general, the ratchet one-way clutch is slightly returned due to backlash when the pawls as torque transmitting members are engaged. Thus, impact or shock noise is generated upon engagement. In order to prevent generation of the impact noise, a damper spring 59 as a damper mechanism is provided between the ratchet one-way clutch mechanism and the vane wheel 51.

The above-mentioned damper mechanism must have certain damper capacity. To this end, a large damper spring must be used. Although a large space is required for receiving the large damper, since such a space is formed by providing a recess in a part of the outer race, there is a problem that strength of the outer race itself is reduced.

SUMMARY OF THE INVENTION

Therefore, an object of the present invention is to provide a stator in which desired damper capacity can be obtained without widening an installation position of a damper spring and making the damper spring larger.

To achieve the above object, a stator in which a damper mechanism is provided between a ratchet one-way clutch mechanism and a vane wheel, according to the present invention, is characterized in that the damper mechanism is provided with a friction element.

The damper mechanism is provided with the friction element in the stator in which the damper mechanism is provided between the ratchet one-way clutch mechanism and the vane wheel. Since the friction element compensates capacity of a damper spring of the damper mechanism, predetermined damper capacity can be obtained without widening a space for the damper spring and making the damper spring larger.

The friction plate is disposed between the vane wheel and an outer race of the ratchet one-way clutch mechanism. Thus, since the stator is subjected to fluid pressure in a torque converter to urge the outer race member and a stator wheel against each other, a friction surface of the friction plate is urged against an opposite friction surface with a moderate load, thereby obtaining the desired damper capacity more positively.

The friction plate has a support portion for supporting a side surface of the torque transmitting member of the ratchet one-way clutch mechanism. Thus, the pawl member as the torque transmitting member can conveniently be supported in an axial direction, thereby stabilizing an operation of the one-way clutch portion.

DESCRIPTION OF THE PREFERRED EMBODIMENTS

Figure 1:
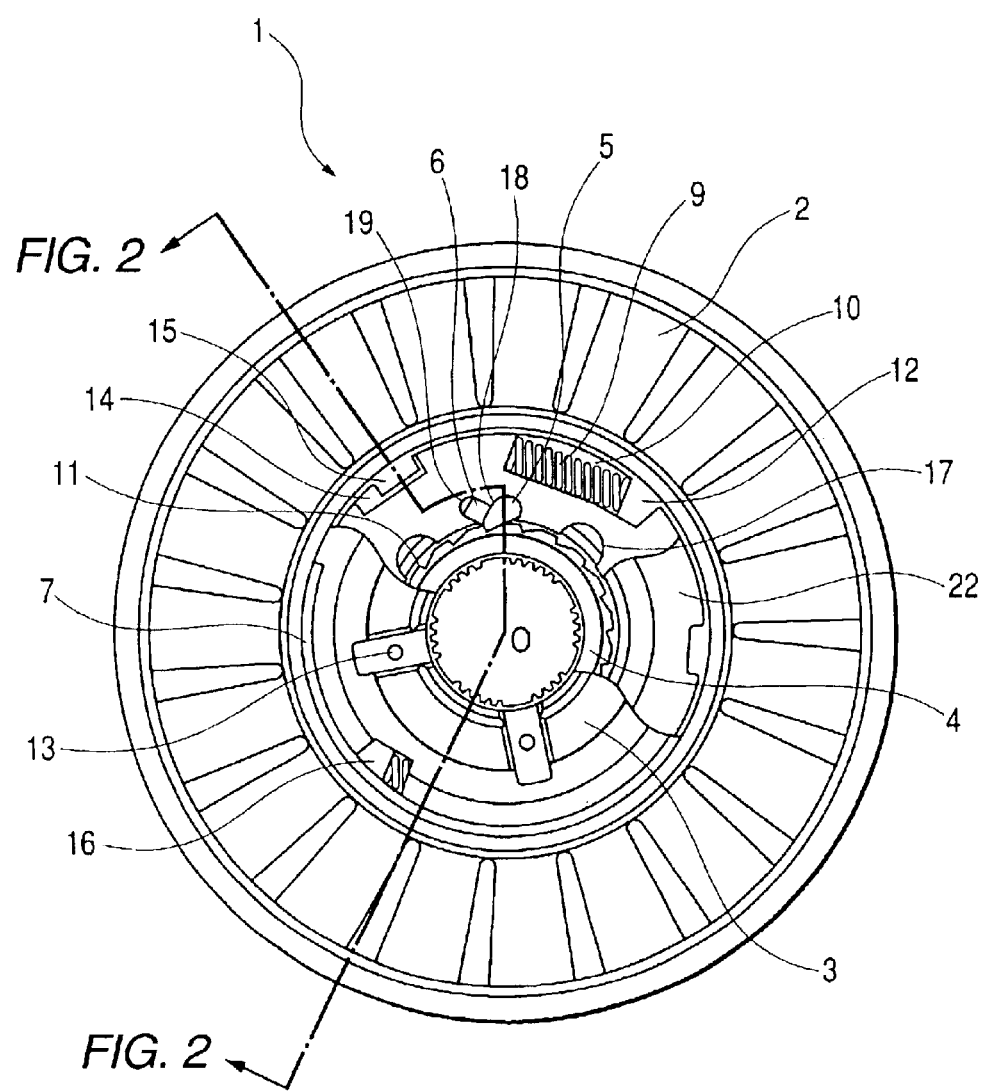
FIG. 1 is a partial fragmental front view of a torque converting stator utilizing a ratchet one-way clutch, looked at from a direction shown by the arrow B in FIG. 2.

The present invention will now be fully explained in connection with embodiments thereof with reference to the accompanying drawings. Incidentally, in the drawings, the same elements are designated by the same reference numerals.

Figure 2:
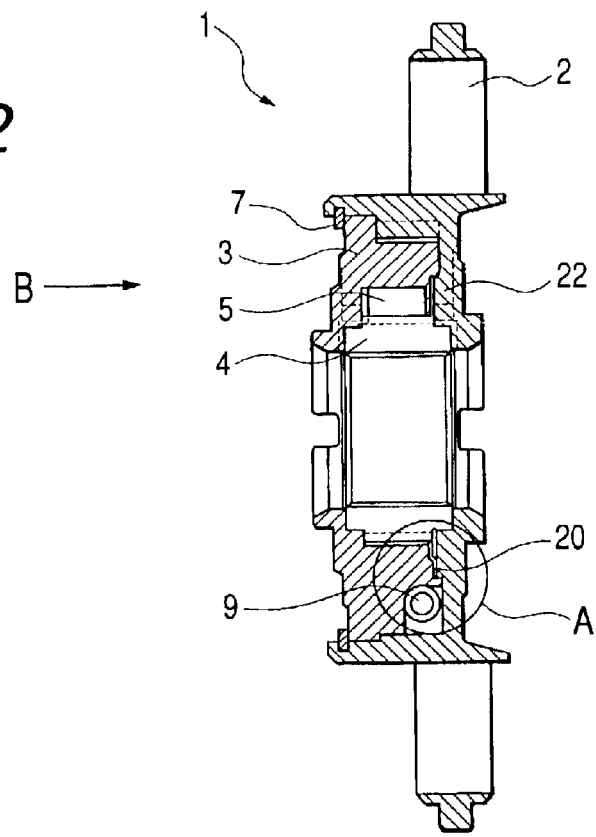
FIG. 2 is a sectional view taken along the line FIG. 2—FIG. 2 in FIG. 1.

FIG. 1 is a front view of a torque converting stator utilizing a ratchet one-way clutch, according to the present invention, and FIG. 2 is a sectional view taken along the line FIG. 2—FIG. 2 in FIG. 1. Incidentally, FIG. 1 is a front view looked at from a direction shown by the arrow B in FIG. 2.

A stator 1 includes an outer race 3 disposed on an inner periphery of a vane wheel 2, and an inner race 4 disposed in coaxial with the outer race 3. A first pocket 18 and a second pocket 19 are formed in an inner periphery of the outer race 3 and, a ratchet or pawl 5 is disposed within the first pocket 18 and an accordion spring 6 for obliquely biasing the pawl 5 in an inner diameter direction is disposed in the second pocket 19. On the other hand, recessed portions 11 into which the pawl 5 can be fitted are formed in an outer periphery of the inner race 4. In place of the accordion spring 6, other spring such as a coil spring may be used, for example.

An inner peripheral side portion 22 of the vane wheel 2 is contacted with an outer periphery and a side surface of the outer race 4 to have a bush function acting as a bearing and supports the pawl 5 and the accordion spring 6 in an axial direction. Further, damper springs 9 are disposed between the inner peripheral side portion 22 and the outer race 3. The inner peripheral portion 22 is provided with recessed portions 12 and the outer peripheral portion of the outer race 3 is provided with recessed portions 10 within which the damper springs 9 are housed.

Each damper spring 9 is urged by the corresponding recessed portion 12 toward a one side within the corresponding recessed portion 10. With this arrangement, shock caused when the pawl 5 is fitted into the recessed portion 11 formed in the outer periphery of the inner race 4 is absorbed by the damper springs 9.

The inner peripheral side portion 22 of the vane wheel 2 is provided with projections 15 protruding radially inwardly and fitted into recessed portions 14 formed in the outer periphery of the outer race 3. Each projection 15 can be shifted within the corresponding recessed portion 14 in a circumferential direction by a predetermined range. A contracting range of the damper spring 9 is limited by the fitting between the recessed portion 15 and the recessed portion 14 so that excessive load is prevented from acting on the damper spring 9, thereby preventing yielding and damage of the damper spring 9.

Incidentally, stress dispersing means 17 are provided in the inner periphery of the outer race 3. The stress dispersing means 17 comprise recesses having a semi-circular axial cross section and constituted by a curved surface and have a function for dispersing local stress acting on the one-way clutch portion. Further, oil ports 13 are provided for supplying lubricating oil to the one-way clutch portion. In addition, there are provided assembling windows within which the respective damper springs are assembled. As shown in FIG. 2, the outer race 3 is supported by a snap ring 7 fitted in the inner periphery of the vane wheel 2 so that the outer race cannot be shifted in the axial direction. Further, it can be seen that both axial ends of the pawl 5 are supported between the inner peripheral side portion 22 of the vane wheel 2 and the outer race 3. An annular friction plate 20 is disposed between the inner peripheral side portion 22 of the vane wheel 2 and the outer race 3 of the ratchet one-way clutch mechanism.

Figure 3:
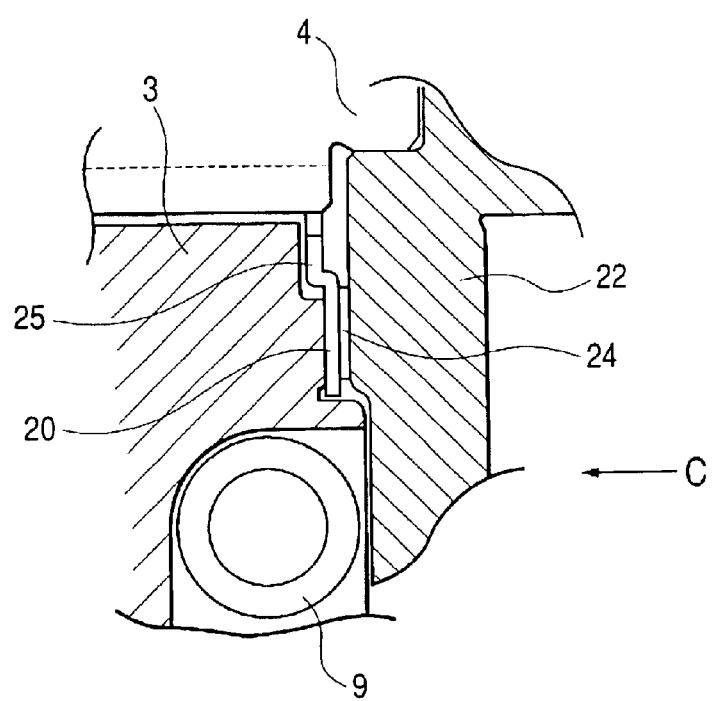
FIG. 3 is an enlarged view of a portion A in FIG. 2.
Figure 4:
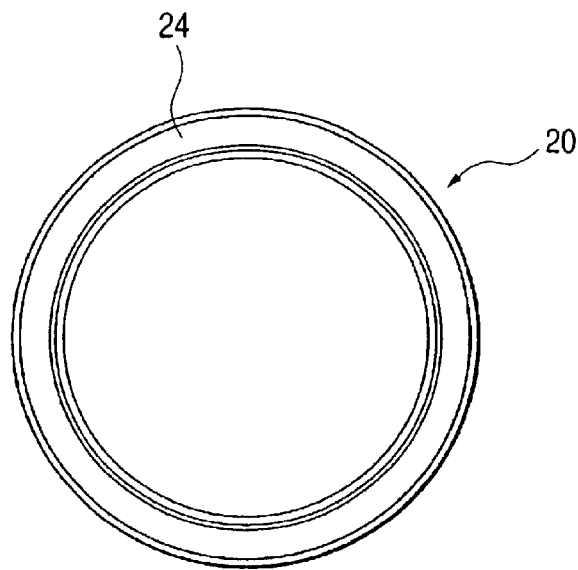
FIG. 4 is a front view of a friction plate, looked at from a direction shown by the arrow C in FIG. 3.
Figure 5:
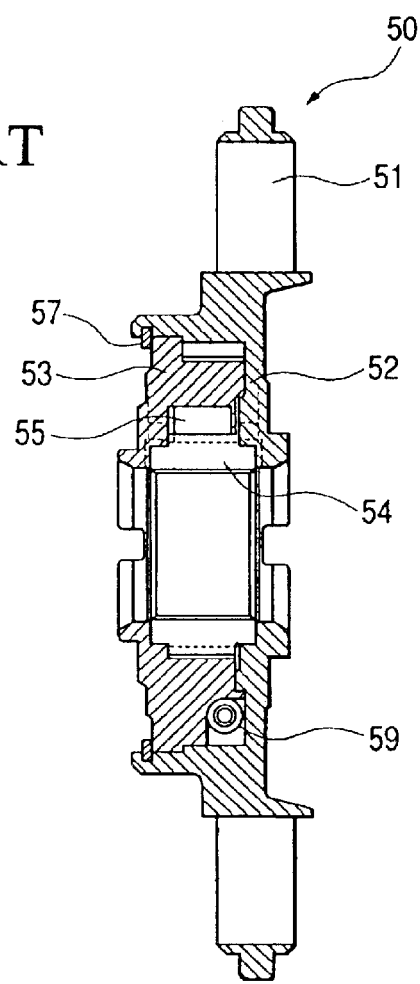
FIG. 5 is an axial sectional view showing a conventional example of a torque converting stator utilizing a ratchet one-way clutch.

Next, the friction plate will be fully described with reference to FIGS. 3 and 4. FIG. 3 is an enlarged view of a portion A in FIG. 2 and is a partial sectional view showing a friction element or friction plate of the present invention in detail. FIG. 4 is a front view showing the friction plate, looked at from a direction shown by the arrow C in FIG. 3. As can be seen from FIG. 4, the friction plate is constituted by adhering an annular friction material 24 around a substantially annular core plate.

As shown in FIG. 3, the friction plate 20 is disposed and pinched axially between the outer race 3 and the inner peripheral side portion 22 so that a friction surface of the friction material 24 is contacted with the inner diameter side portion 22 of the vane wheel 2. Further, on a surface opposite to the surface to which the friction material 24 is stuck, there is provided a pawl supporting portion 25 obtained by bending the inner diameter side portion to be protruded axially outwardly along the entire circumference. The pawl supporting portion 25 is contacted with a bottom of the pawl 5 to support the pawl from below in the radial direction.

Incidentally, since the stator 1 is subjected to fluid pressure in a torque converter to urge the outer race 3 and a stator wheel against each other, the friction surface of the friction material is urged against the opposite friction surface with moderate load. Accordingly, since the urged friction plate 20 can bear a part of the load acting on the damper mechanism, capacity of the damper function can be suppressed. Thus, since use of a larger damper spring is not required, a space for containing the damper spring is not required to be widened. Further, it is not necessary that a damper spring having large capacity be used.

In the embodiment shown in FIG. 3, while an example that the friction material 24 is stuck onto the surface of the friction plate 20 opposed to the inner peripheral side surface 22 of the vane wheel 2 was explained, such a friction material can be stuck onto a surface opposed to the outer race 3. Further, if necessary, friction materials may be stuck onto both surfaces.

As mentioned above, according to the above-mentioned stator of the present invention, the following effects can be obtained:

(1) Since the friction element is provided on the damper mechanism, the desired damper capacity can be obtained without widening the installation position for the damper spring. Further, it is not required that a damper spring having large capacity be used.

(2) Since the annular friction plate that is relatively compact and does not occupy a large space is used as the friction element, the large space is not required, and, thus, the capacity of the damper mechanism can be suppressed.

(3) Since the friction plate is disposed between the vane wheel and the outer race of the ratchet one-way clutch mechanism, the outer race and the stator wheel are urged against each other by the fluid pressure, the friction surface of the friction plate is urged against the opposite friction surface with the moderate load.

(4) Since the friction plate has the supporting portion for supporting the side surface of the torque transmitting member of the ratchet one-way clutch mechanism, the operation of the pawl member of the ratchet one-way clutch can be performed smoothly.

What is claimed is:

1. A stator in which a damper mechanism is provided between a ratchet one-way clutch mechanism and a vane wheel wherein said damper mechanism is provided with a friction element.

wherein said friction element comprises an annular friction plate with friction material thereon, and wherein said friction plate is disposed between said vane wheel and an outer race of said ratchet one-way clutch mechanism.

2. A stator according to claim 1, wherein said friction plate has a supporting portion for supporting a side surface of a torque transmitting member of said ratchet one-way clutch mechanism.

* * * * *